(12) United States Patent
Germanetti

(10) Patent No.: US 6,191,689 B1
(45) Date of Patent: Feb. 20, 2001

(54) DETECTION DEVICE

(75) Inventor: Serge Alexandre Marc Germanetti, Marseilles (FR)

(73) Assignee: Eurocopter, Marseilles (FR)

( * ) Notice: Under 35 U.S.C. 154(b), the term of this patent shall be extended for 0 days.

(21) Appl. No.: 09/312,612

(22) Filed: May 17, 1999

(30) Foreign Application Priority Data

May 18, 1998 (FR) .................................. 98 06227

(51) Int. Cl.$^7$ .................................. G08B 29/00
(52) U.S. Cl. .................. 340/511; 340/506; 340/512
(58) Field of Search ........................ 340/511, 512, 340/506, 507, 508, 509, 510, 527, 517

(56) References Cited

U.S. PATENT DOCUMENTS

| | | | |
|---|---|---|---|
| 5,444,431 | * | 8/1995 | Kenny .................................. 340/541 |
| 5,969,604 | * | 10/1999 | Tice ...................................... 340/506 |

FOREIGN PATENT DOCUMENTS 0658771  6/1995  (EP) .

OTHER PUBLICATIONS

French Search Report date Feb. 5, 1999.
Patent Abstracts of Japan, vol. 96, No. 6, Jun. 28, 1996 and JP 08 043441A (Yazaki Corp.) Feb. 16, 1996.
Patent Abstracts of Japan, vol. 98, No. 9, Jul. 31, 1998, and JP 10 096650A (Nippon Seiki Co Ltd), Apr. 14, 1998.

* cited by examiner

*Primary Examiner*—Daryl Pope
(74) *Attorney, Agent, or Firm*—Stevens, Davis, Miller & Mosher, LLP

(57) ABSTRACT

The present invention relates to a detection device comprising means (3) able to measure the value of a parameter, said device (1) being able to deliver values lying within a first measurement range which is limited at least by a first limit value.

According to the invention, this device (1) furthermore comprises means (5) for modifying before delivery thereof any measured value so as to deliver a corresponding value which is defined in a second measurement range, said second measurement range being limited by at least a first limitation value which is different from said first limit value and which forms part of said first measurement range.

4 Claims, 1 Drawing Sheet

DETECTION DEVICE

The present invention relates to a detection device.

More precisely, it relates to a detection device which includes means comprising in particular a sensor and which are able to measure the value of a parameter, for example a pressure, a force or a speed.

Although not exclusively, said detection device is applied more particularly to an aircraft and especially to a helicopter. By way of example, it may in particular be intended to measure the hydraulic pressure in the vicinity of the main gearbox of a helicopter.

In a known manner, such a detection device converts the measured value into a delivered value, for example in volts (V), which is situated within a measurement range defined between two lower and upper limit values, for example between 0 and 10 V.

Such a known detection device nevertheless has a major drawback. This is because it delivers a value equal to said lower limit value, in the aforesaid example 0V, in two different situations:

on the one hand, when the measured value does indeed correspond to this limit value; but also on the other hand, when said detection device exhibits an operating defect, for example when it is not energized or when it is faulty.

Consequently, for such a measurement it is impossible to ascertain which of the two above situations holds, this being a great impediment in particular for maintenance reasons and moreover possibly being very dangerous. For example, in flight when a detection device of an aircraft which is measuring an important parameter signals a lower limit value (0V) of this kind, the latter may lead to the belief that it represents a value actually measured, whereas in reality said device is faulty or simply not energized.

A similar situation may occur for a delivered value corresponding to the upper limit value since, in this case, said value may arise either from an actual measurement, or from a short-circuit in said detection device.

The present invention relates to a detection device whose object is to remedy these drawbacks.

For this purpose, according to the invention, said detection device comprising means able to measure the value of a parameter, said device being able to deliver values lying within a first measurement range which is limited at least by a first limit value, is noteworthy in that it furthermore comprises means for modifying before delivery thereof any measured value so as to deliver a corresponding value which is defined in a second measurement range, said second measurement range being limited by at least a first limitation value which is different from said first limit value and which forms part of said first measurement range.

Thus, by virtue of the invention, it may be ascertained that:

any value delivered which lies within said second measurement range corresponds to an actual measurement; whereas any value delivered which lies within said first measurement range, but not within said second measurement range, for example a value which is equal to said first limit value, is representative of the malfunctioning of said detection device, which may be due in particular to a fault or to a defect with the latter's energy supply, this making it possible to remedy the aforesaid drawbacks.

Moreover, advantageously, said first measurement range comprises a second limit value, one of said first and second limit values being the minimum value and the other the maximum value of said first measurement range, and said second measurement range comprises a second limitation value, said first and second limitation values being different from said second limit value.

Thus, the protection in accordance with the invention is provided in respect of both limit values (upper and lower) of the measurement range of said detection device.

Furthermore, preferably, said first limit value is zero and corresponds to the minimum value of said first measurement range.

Additionally, in a particularly advantageous embodiment, the device in accordance with the invention furthermore comprises means for detecting any value lying within said first measurement range, but not lying within said second measurement range.

In case of detection of such a value, said means may in particular:

trigger an alarm, for example visual or audible, so as to warn an operator, in particular a pilot of an aircraft, of the malfunctioning of said device, so that he may take adequate measures, for example energize or replace said device or signal this incident to a qualified person; and/or record said value so as to retrieve it subsequently, in particular for a maintenance operator intended to repair or replace said detection device.

Moreover, advantageously, the detection device in accordance with the invention furthermore comprises means able to indicate the absence of or a fault in at least one of the aforesaid means of said detection device.

The figures of the appended drawing will elucidate the manner in which the invention may be embodied. In these figures, identical references denote similar elements.

Figure 1:
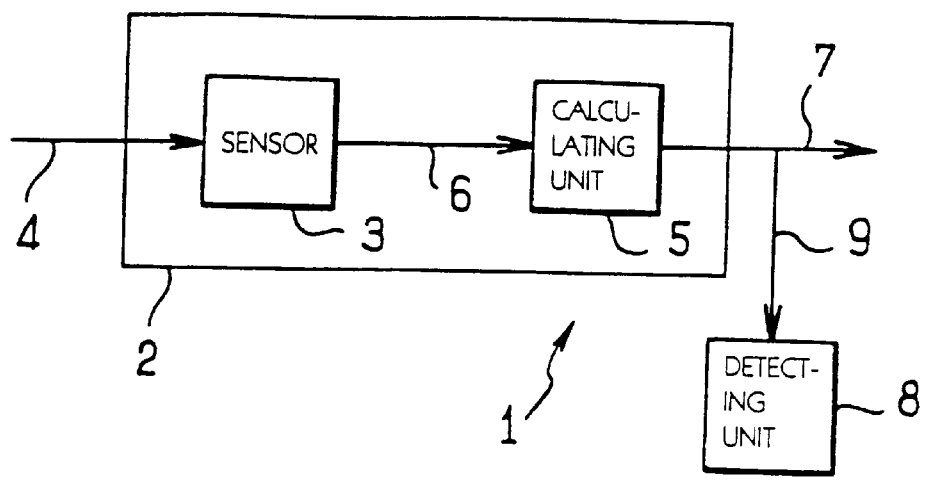
FIG. 1 is the schematic diagram of a detection device in accordance with the invention.

The detection device 1 in accordance with the invention and represented diagrammatically in FIG. 1 is intended for measuring the value of a characteristic parameter, for example a pressure, an angular value or a force. For this purpose, said device 1 can in particular be mounted on an aircraft, and especially a helicopter, for example to measure the pressure of a hydraulic circuit.

In a known manner, said device 1 includes detection means 2 which comprise a sensor 3 able to measure the value of said characteristic parameter, as illustrated diagrammatically by a link 4.

Figure 2:
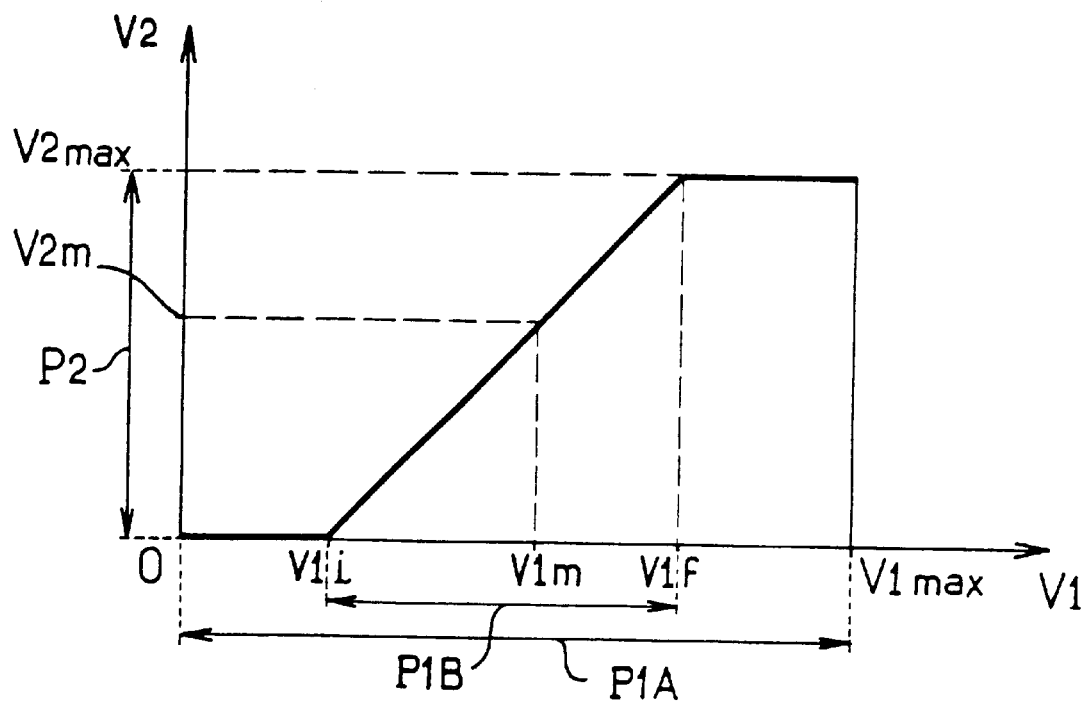
FIG. 2 is a graph making it possible to illustrate the effect on the values delivered, this effect being engendered by the device in accordance with the invention.

Said detection means 2 exhibit a measurement range P1A, whose delivered values V1 may lie between limit values 0 and V1max, as represented in FIG. 2.

According to the invention, the device 1 furthermore comprises means 5, for example a calculating unit, which are linked by a link 6 to said means 3 and are able to deliver values by way of a link 7 to a user device (not represented).

Said means 5 are formed in such a way as to modify all the values actually measured by the means 3 so that the corresponding values finally delivered are situated within a measurement range P1B limited by limitation values V1i and V1f, respectively above and below said limit values 0 and V1max.

Thus, by virtue of the invention, a value V1 delivered by way of the link 7, which is situated:

within said measurement range P1B, corresponds to a value actually measured;

between the values 0 and V1i, illustrates an operating defect in the device 1, and especially a fault or an energy-supply defect; and between the values V1f and V1max, also illustrates an operating defect in the device 1, and especially a short-circuit.

This makes it possible to differentiate between a measured value which is equal to a limit value and a value which is representative of malfunctioning, and thus to remedy the aforesaid drawbacks.

Of course, the values measured and delivered between V1i and V1f may if necessary, for example for processing reasons, be easily transformed into values V2 situated within a range of values P2 which is limited respectively by values 0 and V2max, V2max possibly being equal for example to V1max.

Such a transformation, for example linear, is illustrated in FIG. 2, a value V1m of the range P1B being transformed into a value V2m of the range P2.

The device 1 in accordance with the invention furthermore comprises, as illustrated in FIG. 1, means 8 linked by a link 9 to the output of the means 2, so as to detect malfunctioning of the device 1, that is to say to detect any value V1 delivered which lies between 0 and V1i or between V1f and V1max.

According to the invention, these means 8 may be formed so as to, in case of the detection of malfunctioning:

trigger an alarm, for example visual or audible, so as to warn an operator, in particular a pilot of an aircraft, of the malfunctioning of said device, so that he may energize it, replace it or signal this incident to a qualified person; and/or record said value so as to retrieve it subsequently, in particular for a maintenance operator intended to repair or replace said detection device 1.

Moreover, in a particular embodiment, these means 8 may also be formed so as:

in the case of an operating defect, to trigger an alarm; and for values representative of correct operation, to carry out the aforesaid transformation and deliver values V2 lying between 0 and V2max, this also making it possible to remedy the aforesaid drawbacks of the known devices, whilst also delivering values lying between 0 and V2max, V2max possibly being chosen equal to V1max.

Additionally, said detection device 1 can also comprise means (not represented) which are intended to indicate to an operator the absence of or a fault in any one of the various means 3, 5 and 8 of said device 1.

What is claimed is:

1. A detection device comprising means for measuring the value of a parameter, said device for delivering values lying within a first measurement range which is limited by a minimum limit value and a maximum limit value, said device further comprising means for modifying before delivery thereof any measured value so as to deliver a corresponding value which is defined in a second measurement range, said second measurement range being limited by a first limitation value and a second limitation value which are different from said minimum and maximum limit values and which form part of said first measurement range.

2. The device as claimed in claim 1, wherein said minimum limit value is zero and corresponds to the minimum value of said first measurement range.

3. The device as claimed in claim 1, further comprising means for detecting any value lying within said first measurement range, but not lying within said second measurement range.

4. The device as claimed in claim 1, further comprising means for indicating the absence of or a fault in at least one of said means of the detection device.

* * * * *